United States Patent [19]

Duffield

[11] Patent Number: 5,400,513
[45] Date of Patent: Mar. 28, 1995

[54] IMAGE SIZE MEASURING DEVICE

[76] Inventor: Christopher Duffield, 402 N. Main, Tucson, Ariz. 85701

[21] Appl. No.: 28,983

[22] Filed: Mar. 10, 1993

[51] Int. Cl.$^6$ .............................................. G01B 11/28
[52] U.S. Cl. ..................... 33/1 B; 33/15 D; 235/61 GM
[58] Field of Search ................ 33/1 A, 1 B, 1 C, 1 K, 33/15 B, 15 D, 679.1; 235/64.7, 70 A, 70 C, 78 M, 83, 84, 61 GM, 61 PS

[56] References Cited

U.S. PATENT DOCUMENTS

| | | | |
|---|---|---|---|
| 933,605 | 9/1909 | Watkins | 235/64.7 |
| 1,001,061 | 8/1911 | Michaelson | 235/70 A |
| 1,796,955 | 3/1931 | Morris | 33/679.1 |
| 2,118,773 | 5/1938 | Ball | 33/15 B |
| 2,495,777 | 1/1950 | Schroeder | 33/15 D |
| 3,514,582 | 5/1970 | Sanderson | 33/15 B |
| 4,336,653 | 6/1982 | Stantom | 33/1 B |
| 4,538,352 | 9/1985 | Frith | 33/1 B |

FOREIGN PATENT DOCUMENTS

| | | | |
|---|---|---|---|
| 2246004 | 4/1975 | France | 235/70 A |
| 1034046 | 8/1983 | U.S.S.R. | 235/70 A |
| 1525432 | 11/1989 | U.S.S.R. | 33/679.1 |

*Primary Examiner*—Thomas B. Will

[57] ABSTRACT

The present invention makes possible the quick, accurate analysis of images, especially medical diagnostic images of unknown magnification, to determine the size of objects visible therein, by reference to an object of known size or to determine the magnification ratio when it is unknown. There is provided a transparent image measuring device having one or more line pairs of varying spacing. Various scale markers are included on lines running substantially at right angles to the line pairs. The device is placed on the image over an object of known size (the reference object). The device is located so that the reference object just bridges between the spaced-apart lines in a particular location which is associated with a scale marker corresponding to the true size of the reference object. Once the line spacing of the reference object and the corresponding scale marker are determined, the device is moved to overlie the object of unknown size such that the object of unknown size just bridges between continuations of the lines having, in general, different spacing than that for the reference object. The size of the unknown object is then immediately read from the orthogonal scale marker associated with the new spacing without the operator performing any mathematical calculations or table look-up. Where the magnification ratio is known, a reference object is not needed and the device may be set to indicate the dimensions of objects of unknown size directly.

18 Claims, 4 Drawing Sheets

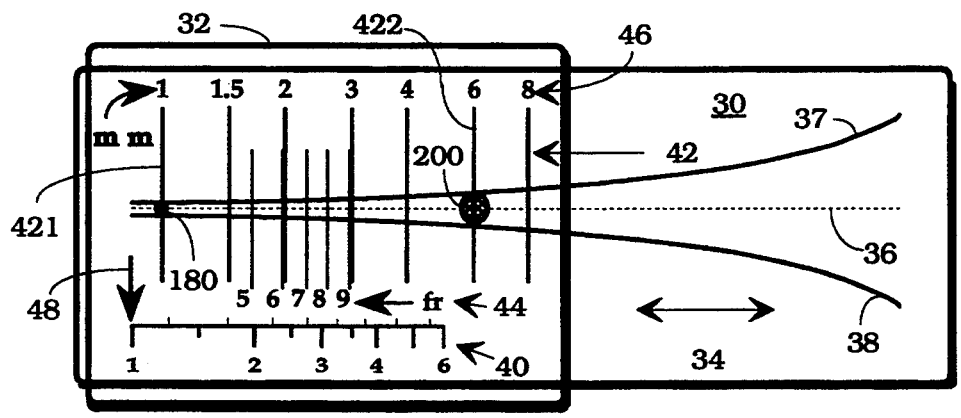
FIG. 4
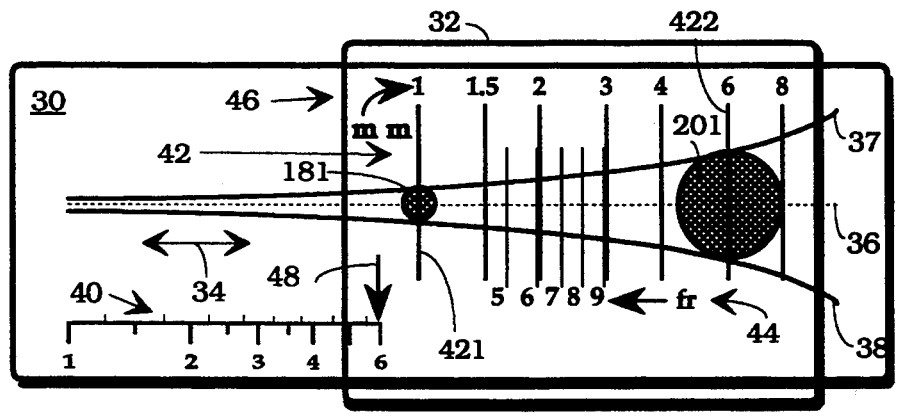
FIG. 5
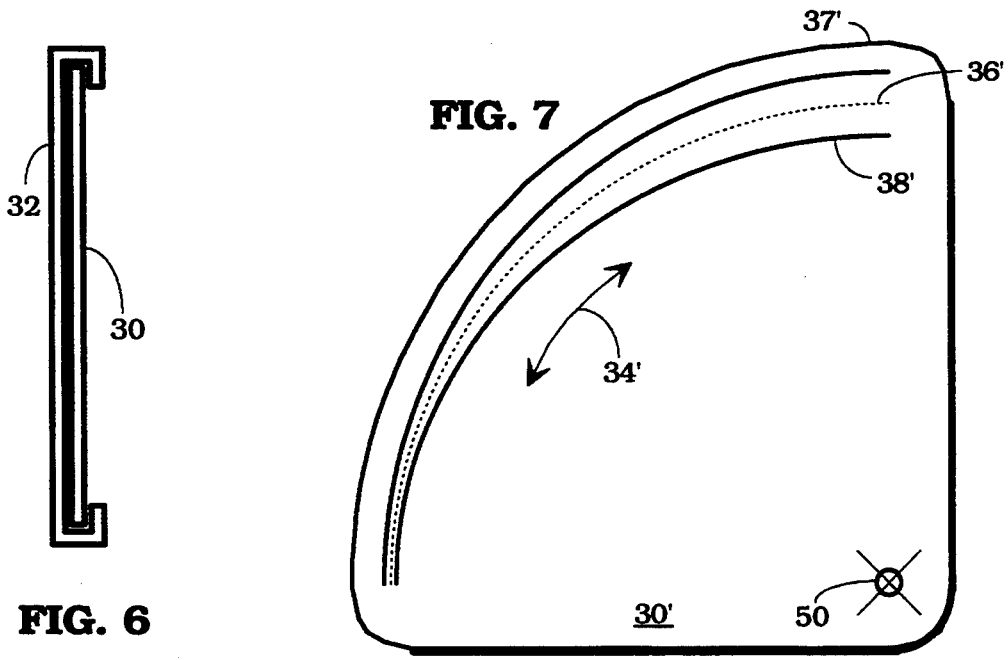
FIG. 6
FIG. 7

IMAGE SIZE MEASURING DEVICE

FIELD OF THE INVENTION

This inventions concerns an apparatus and method for determining the magnification ratio of an image or measuring the size of an object in an image of known or uncertain magnification.

BACKGROUND OF THE INVENTION

In the technical arts, there are many situations when it is desired to determine the size of an object in a photograph or other image. This may occur during photogrammetry, photo-intelligence, on maps and during analysis of aerial or space based images, or in connection with medical images, as for example, images produced by X-ray, Cat Scan, Ultra-Sound, PET Scan Tomographic or other apparatus. The image may be on film or a film print or on a projection screen or on an electronic display such as a CRT or other media. As used herein, the word "film" is intended to include all display media and the word "image" is intended to refer to any type of displayed information, as for example but not limited to those types of images mentioned above.

A number of means and methods have been developed in the prior an for determining the size or placement or displacement of objects in images. For example, U.S. Pat. No. 2,557,428 to Grostic describes an instrument for determining displacements in X-ray images, especially lateral displacements of spinal vertebra. In U.S. Pat. No. 2,819,526, Brown, Jr., described a calculator for use with X-ray images for determining object size. In U.S. Pat. No. 4,131,998, Spears described a tumor growth measurement device for use with X-ray images. In U.S. Pat. No. 4,630,375, Spolyar describes an apparatus for gauging and determining spatial coordinates for a source of radiation to be employed in obtaining a radiograph of a patient, especially in connection with dental images. In U.S. Pat. No. 4,481,719, Grover describes an apparatus and method for measuring the displacement of the arms of a drafting machine and in U.S. Pat. No. 4,974,164, Lewis et at., describe a digital measuring and proportioning instrument comprising a hand-held microcomputer based ruler-like measuring and calculating instrument that is particularly adapted for measuring the sizes of objects in the field of graphic arts. In U.S. Pat. No. 5,170,570, Mays, Jr., describes a hand, finger and joint measuring gauge comprising a device having V-shaped notches therein with an associated scale showing the widths of the notches at different locations therein.

While the foregoing and other prior an devices and methods have proved useful, they suffer from a number of disadvantages well known in the art. For example, some require that the magnification ratio be known, or that the source to object to film-plane distances be known. Others are complex to use or costly or have an inadequate measurement range.

In cases where the exact magnification ratio of the image is not known, it must be determined from the image itself. With many of the prior art methods this is not easily accomplished. One familiar method is to measure the dimension in the image of an object which is of known size and then use this information to determine the actual size of other objects visible in the same image. For example, if a medical X-ray image shows the presence of a catheter known to be 2 mm in actual diameter, but appearing in the image to be only 1.5 mm in diameter, then by simple arithmetic, one knows that the adjacent blood vessel which has an apparent size in the image of 2.5 mm, is actually $(2.0/1.5) \times (2.5) = 3.3$ mm. The scaling may be performed by hand or mental calculation, or using a slide rule or calculator, or by using look-up tables.

This practice of scaling from objects of known size to determine the size of other objects in an image of unknown magnification, is well known in the art. However, the prior art practice of using, for example, a ruler and calculator to perform the measurement and scaling is highly prone to errors. In the medical imaging field, measurement errors can have life threatening consequences. For example, suppose a major blood vessel appearing on a medical image is erroneously determined to be larger than it actually is. Based on that erroneous measurement an operator might mistakenly inform the medical practitioner that a catheter of a certain size would fit in the blood vessel. But, because a mistake has been made in measuring the apparent blood vessel size on the medical image, when the catheter is inserted it could rupture the blood vessel wall, possibly causing severe internal bleeding with potentially life threatening consequences.

Thus, there is a continuing need for an improved means and method for measuring the size of objects in images of a known or unknown magnification and for determining the magnification. While this need is particularly acute in the context of medical imaging because of the potential impact of errors on human life, it is also important to other fields of endeavor where accuracy and ease of measuring the size of various objects and/or the magnification of an image are also important.

SUMMARY OF THE INVENTION

The present invention makes possible the quick, accurate dimensional analysis of images, especially medical diagnostic images. It is useful for determining the size of objects visible in the image or for determining the magnification of an image or a combination thereof. The dimensions of an object of unknown size may be determined from the magnification ratio in combination with a scale provided by the present invention. Alternatively, the same scale may be used in combination with a reference object of known size to determine the magnification ratio if not known and the size of an object of unknown dimensions.

There is provided a transparent image measuring device having one or more line pairs of varying spacing. Various scale markers are included on a multiplicity of lines running substantially at right angles to the line pairs. In a first embodiment, the line pairs and multiplicity of lines are fixed with respect to each other. In a further embodiment the line pairs and the multiplicity of lines may be moved with respect to each other.

When the magnification ratio is unknown, the device is placed on the image over an object of known size (the reference object). The device is located so that the reference object just bridges between a line pair in a particular location which is associated with a scale marker corresponding to one of the multiplicity of lines and to the true size of the reference object. Once the line spacing of the reference object and the corresponding scale marker are determined, the magnification ratio of the image is known. The device is moved to overlie the object of unknown size such that the object of unknown size just bridges between continuations of the line pair having, in general, different spacing than that for the reference object. The size of the unknown object is then immediately read from the scale marker associated with another of the multiplicity of lines corresponding to the new spacing without the operator performing any mathematical calculations or table look-up. When the magnification ratio is known a priori, it is not necessary to use the reference object.

In a preferred embodiment, the spacing between the line pairs varies exponentially with distance along the line pairs and the spacing between the multiplicity of lines, which are arranged to intersect one or more of the line pairs at approximately, but not necessarily exactly right angles, varies as the log of the distance along the line pairs. In a preferred embodiment, the distance along the line pairs in which their spacing doubles and in which the spacing of the multiple line pairs doubles, is the same. The magnification ratio scale desirably follows the same relationship.

The invented device and method are particularly useful for determining sizes of blood vessels and other objects in medical images so that catheters and other intrusive devices of the proper size may be chosen by the medical practitioner.

BRIEF DESCRIPTION OF THE DRAWINGS

FIGS. 4 and 5 are plan views of the first and second portions of FIGS. 2 and 3, respectively, when juxtaposed to form an image size measuring apparatus according to the second embodiment of the present invention, in different relative positions;

FIG. 6 is an end view of the device of FIGS. 4–5;

FIGS. 7 and 8 are plan views of first and second portions, respectively, of an image measuring apparatus according to a still further embodiment of the present invention;

DETAILED DESCRIPTION OF THE PREFERRED EMBODIMENT

Figure 1:
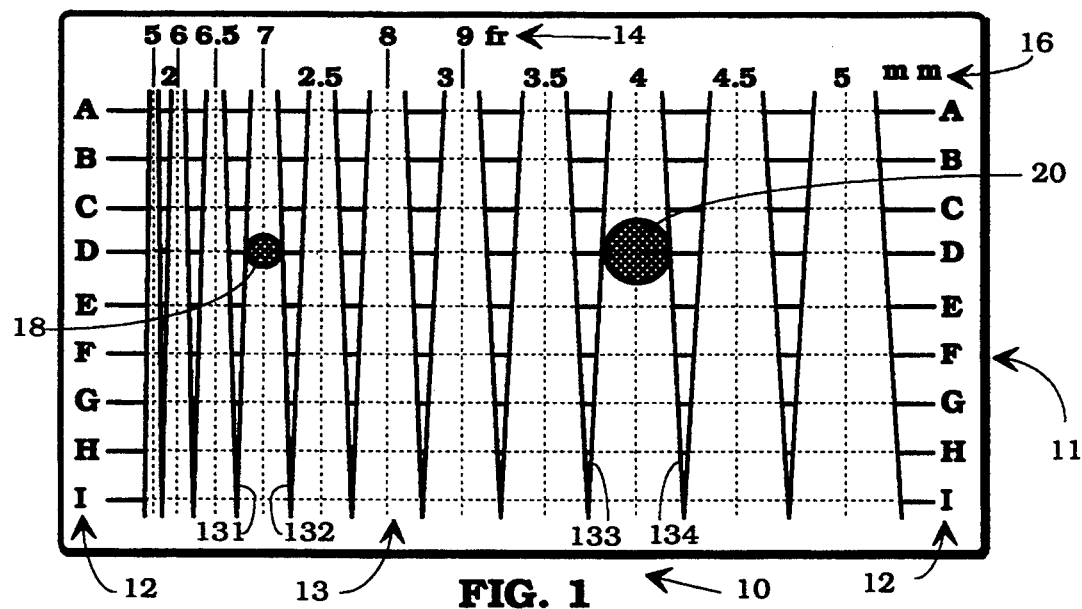
FIG. 1 is a plan view of an image measuring size apparatus according to a first embodiment of the present invention.

FIG. 1 is a plan view of an image size measuring apparatus according to a first embodiment of the present invention. Transparent plastic card 10 has printed thereon intersecting groups of lines 11 and 13 and scales 12, 14, 16. Lines 11 are, for example horizontal, and are identified by scale 12 comprising the letters A, B, C, D, . . . etc. Lines 13 are inclined at angles, and occur in pairs. The line pairs are identified in this example, by scale 14 expressed in "french" (fr) units and scale 16 expressed in millimeters (mm), but any convenient scales may be used. French units are much used in connection with medical imaging and are well known in the art. To a good approximation, 6 fr=2 mm, 9 fr=3 mm, and so forth.

The user places device 10 over object 18 of known size, i.e., the reference object, for example, a catheter of size fr=7 on scale 14. Object 18 is placed under the vertical dashed line corresponding to scale value fr=7 and device 10 is moved vertically until object 18 just bridges between the solid lines associated with scale value fr=7. In the example of FIG. 1 this occurs at horizontal line D. Thus, line D establishes the magnification ratio of the image. If the true size of reference object 18 is fr=7, then the image size is the spacing between lines 131, 132 at line D. Line D can now be used to determine the size of any other object within the range of device 10.

Device 10 is then moved until object 20 of unknown size lies on line D. Device 10 is then moved horizontally to determine which line pair has a spacing corresponding to the size of object 20, that is, until object 20 just bridges between two line segments on line D, e.g., line segments 133–134. The operator then reads the size of object 20 from the scale index corresponding to the line pair 133–134, in this case, 4 mm.

Device 10 can be constructed in the following way. Assume for simplicity, that the spacing of line pairs 13 at line A corresponds to a magnification ratio of unity, that is, the spacing of line pairs 13 at line A is equal to scale markers at the top of device 10. Assume further that device 10 is intended to handle magnification ratios up to 2:1, that is, image sizes up to twice the actual object sizes. With this assumption, then the spacing of each line pair 13 at line I is made equal to twice its spacing at line A. In order to provide a convenient set of intermediate magnifications, lines B through H are evenly spaced between lines A and I, and lines 13 are straight lines. For compactness, the lower ends of each line pair 13 at line I are approximately in contact. This gives the smallest overall size for device 10 of a given operating range.

Those of skill in the art will understand that the foregoing description of the arrangement of lines on device 10 is intended to be merely exemplary and not limiting, and that other magnification ratios and more or fewer intermediate magnification ratio lines (e.g., lines B–H) could be used. Further, as many different lines pairs 13 can be used as is desired consistent with any overall size limits that may be desired for device 10.

Device 10 has the great advantage that it has no moving pans. It is extremely simple and inexpensive to produce and very easy to use. Because of its ease of use, the probability of error is small. Further, the device can be adapted to serve a wide variety of measurement needs by using different line pair separations and different scale markers. For example, if the objects being measured are, for example, in aerial or satellite photographs, then scale values 16 may be meters or yards, or kilometers or miles, or whatever. Further, those of skill in the art will understand that the spacing of line pairs 13 at line A need not correspond to a 1:1 magnification ratio, but may have any predetermined magnification milo. For example, if the line spacing at A corresponds to a ratio of 10:1 and there is a 2:1 difference in line spacing between lines A and line I, then line I corresponds to a magnification ratio of 20:1. Any magnification ratio can be accommodated by having a set of cards 10 with different combinations of line spacings and scale markers.

An example of the apparatus of FIG. 1 was constructed on a plastic sheet measuring about 100 by 165 mm, where the closest spaced ends of the most closely spaced line pair (e.g., fr=5) were about 2.5 mm apart, the furthest spaced ends of the most closely spaced line pair were about 7 mm apart, the closest spaced ends of the most widely spaced line pair (e.g., mm=5) were about 8 mm apart and the furthest spaced ends of the most widely spaced line pair were about 22 mm apart, and the intermediately spaced lines pairs provided an overlapping range of spacings. The magnification ratio ranged from about 1.6 at line A to about 4.4 at line I.

The arrangement of FIG. 1 shows discrete values of distance (e.g., scale values 14, 16) along the top of the card and a continuous range of magnifications in the vertical direction measured by the continuously variable spacing between line pairs 13. Horizontal lines 11 running at approximately right angles through the approximately vertically oriented divergent line pairs 13, identify particular values 12 of the magnification along the side of the card, e.g., values A–I. Those of skill in the art will understand based on the description herein that the placement of scale values 14, 16 and 12 can be interchanged, or equivalently, the array of lines 11, 13 can be rotated by ninety degrees. The resulting arrangement (not shown) permits equivalent measurements of object size to be made.

Figure 2:
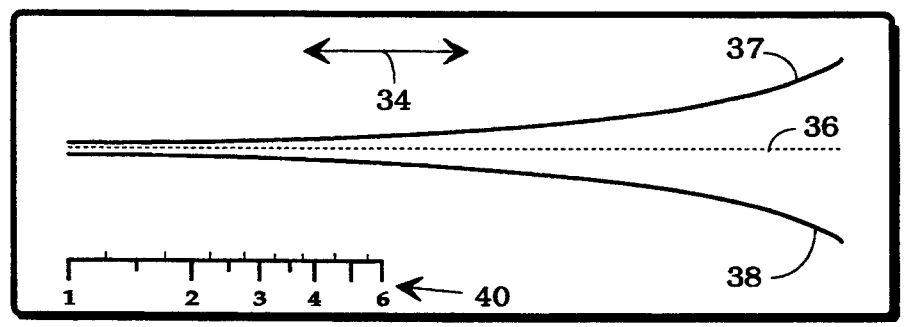
FIG. 2 is a plan view of a first portion of an image size measuring apparatus according to a second embodiment of the present invention.
Figure 3:
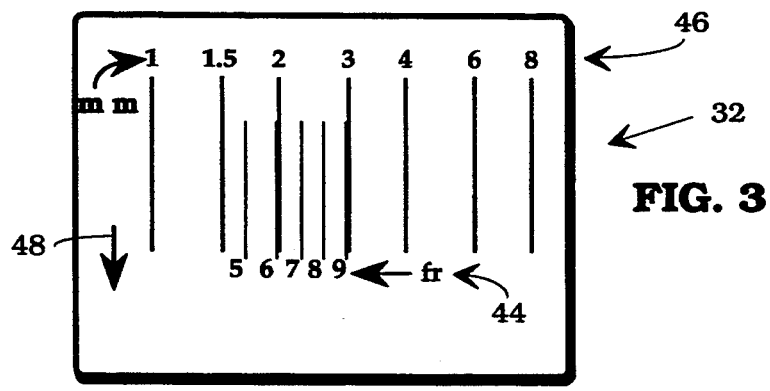
FIG. 3 is a plan view of a second portion of the image size measuring apparatus according to the second embodiment of the present invention.

FIG. 2 is a plan view of first portion 30 and FIG. 3 is a plan view of second portion 32 of an image size measuring apparatus according to a second embodiment of the present invention. Portions 30 and 32 are transparent with visible markings (e.g., lines and scale values) thereon. Portions 30, 32 fit together as illustrated in FIGS. 4–6 so that portion 32 slides along portion 30 in a horizontal direction in the figures. Slider portion 32 conveniently curves around to engage portion 30 as shown, for example, in end view FIG. 6. This is simply to retain slider portion 32 on portion 30 so that motion of slider portion 32 is limited to the long dimension of portion 30. Any means for providing such sliding action may be used. Slider 32 moves in direction 34 along card 30. Card 30 has thereon dashed line 36 bracketed by symmetrical curved lines 37–38 which diverge as they run from left to right. Slider 32 has multiple, spaced-apart, vertical line segments 42 which are labeled, in this example, to correspond to (fr) scale 44 and (mm) scale 46, but any convenient scale will do. Arrow 48 on slider 32 correlates with magnification ratio scale 40 on card 30.

FIGS. 4–6 show card portion 30 and slider portion 32 combined, the difference between FIGS. 4 and 5 merely being their relative position, as might be used for objects of different size and/or images of different magnification ratios. Referring now to FIG. 4, when the magnification ratio is not known, the operator places card 30 with dashed line 36 over object 180 of known dimensions (the reference object) and slides card 30 left-right until object 180 just spans the distance between curved lines 37–38. The user then moves slider 32 left-right until line 421 of vertical lines 42 corresponding to the known size of object 180 (e.g., mm=1) crosses object 180. Then, clamping card 30 and slider 32 together so that slider 32 cannot move relative to card 30, the user places card 30 so that unknown size object 200 just spans the distance between curved lines 37–38. The operator may then read the size of object 200 directly from the scale value associated with line segment 422 bisecting object 200. In the example shown, this is the 6 mm line. Object 200 is thus 6 mm across. Arrow 48 and scale 40 show that, for this particular example, the magnification ratio is 1:1. When object 200 falls between lines 42, the scale values are readily interpolated.

FIG. 5 shows an alternative example where the magnification ratio is different and the apparent size of reference object 181 is much larger, even though its actual size (e.g., 1 mm) is the same. The operator places card 30 such that object 181 just spans the distance between lines 37, 38 and then moves slider 32 until vertical line 421 corresponding to the actual size (e.g., 1 mm) passes through object 181. With portions 30, 32 clamped together, the combination is moved over unknown size object 201 and arranged so that object 201 just bridges lines 37, 38, and the size of object 201 read from the scale markers associate with vertical line 422 passing through the center of object 201, or by interpolating between adjacent lines if object 201 lies between lines 42. In the example, shown, line 422 corresponds to the 6 mm scale value and object 201 is therefore about 6 mm in size.

As shown by arrow 48 pointing to scale 40, the magnification ratio of the image in FIG. 5 is found to be 6:1. This procedure allows the unknown magnification ratio as well as the unknown object size to be determined by use of the reference object of known size in connection with the present invention.

When the magnification ratio is known, as for example 1:1 in FIG. 4 or 6:1 in FIG. 5, it is not necessary to use a reference object. Slider 32 is moved so that arrow 48 is juxtaposed at the correct position on scale 40 corresponding to the known magnification ratio. The size of unknown object 200 or 201 is read directly from scales 14, 16 at the location on or between the one of multiple lines 42 which passes through the center of the unknown object where it just bridges between lines 37, 38. For example, in FIGS. 4 and 5, line 422 corresponding to 6 mm just passes through unknown object 200 or 201. The effect of differences in magnification ratio is readily apparent.

A test device suitable for medical imaging was constructed with portion 30 measuring about 70 by 170 mm and portion 32 measuring about 72 by 95 mm. It conveniently fit in the user's pocket. The separation of lines 37, 38 varied exponentially from about 1.5 mm to about 30 mm. Multiple lines 42 were logarithmically spaced and represented scale values from 1.5 mm to 9 mm. The 1.5 mm and 9 mm lines were about 71 mm apart. The distance along lines 37, 38 for their separation to double and the distance between lines 42 for their scale values to double and the distance along scale 40 for the magnification ratio to double, were the same.

In order to insure that slider 32 remains on base card 30, slight lateral protrusions (not shown) may be optionally provided at the ends of portion 30 to prevent slider 32 from sliding off the ends of portion 30 and becoming separated therefrom. Conversely, a protrusion (not shown) may be provided on the interior edge or over lap portion of slider 32 which engages a detent in card 30 to retain slider 32 from becoming separated from card 30. While FIG. 6 illustrates an arrangement wherein portion 32 slides over portion 30, the inverse arrangement can also be used wherein portion 30 slides over portion 32.

Figure 8:
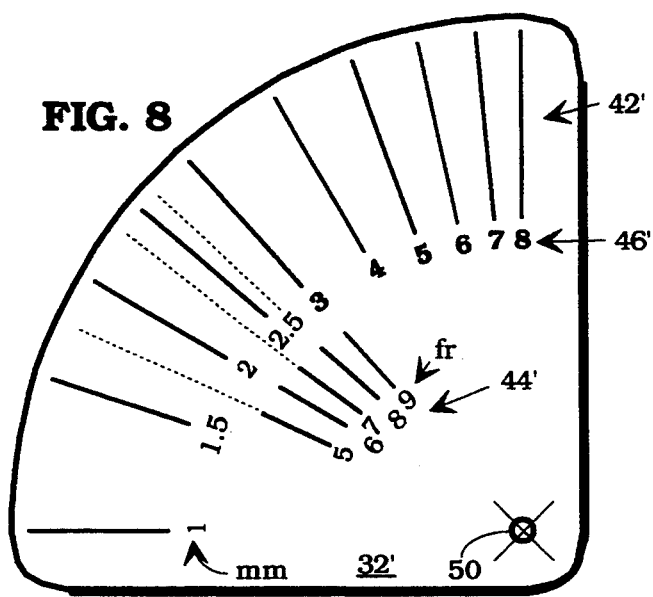
Figure 9:
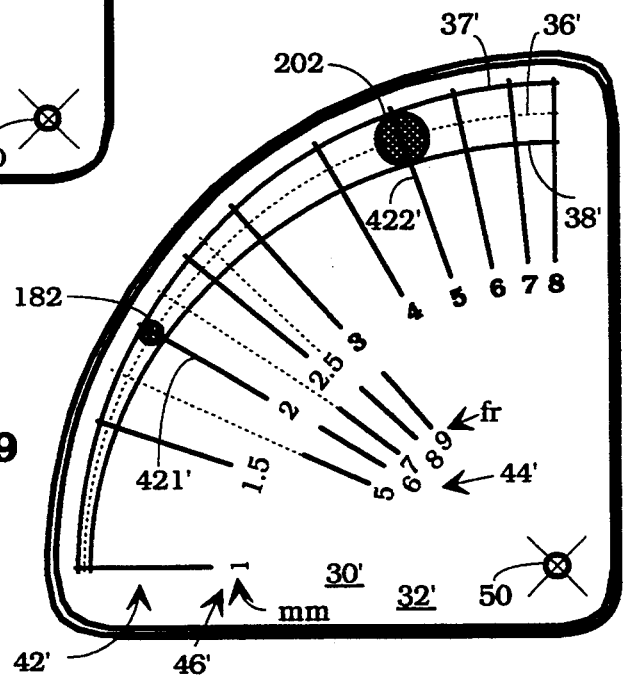
FIGS. 9 and 10 are plan views of the first and second portions of FIGS. 6 and 7, respectively, when juxtaposed to form an image size measuring apparatus according to the further embodiment of the present invention.
Figure 10:
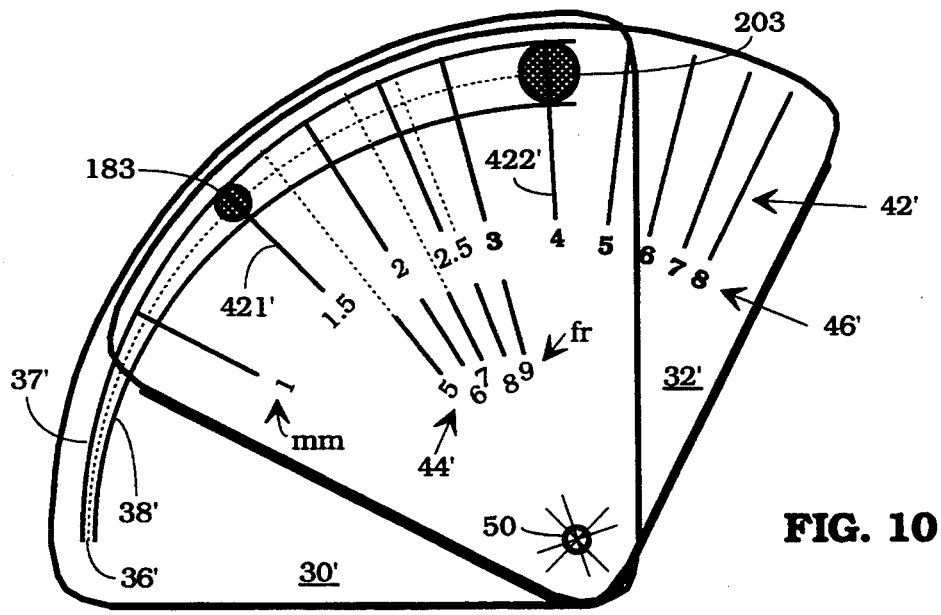

FIGS. 7 is a plan view of first portion 30′ and FIG. 8 is a plan view of a second portion 32′ of an image measuring apparatus according to a still further embodiment of the present invention. Portions 30' and 32' are analogous to portions 30, 32 in function, but have a different geometric arrangement. When juxtaposed, portions 30', 32' are intended to rotate with respect to each other around pivot 50 rather than slide as with portions 30, 32. FIGS. 9 and 10 are plan views of the first and second portions of FIGS. 6 and 7, respectively, when juxtaposed to form an image size measuring apparatus according to the further embodiment of the present invention.

Transparent plastic card 30' is analogous to plastic card 30 and has thereon divergent curved lines 37', 38' analogous to lines 37, 38. Portion 32' which is rotatably coupled to portion 30' at pivot 50, has thereon spaced-apart radial lines 42' analogous to lines 42. The lines are identified by (mm) scale 46' and (fr) scale 44'. When juxtaposed, portions 30' and 32' have the appearance illustrated in two positions in FIGS. 9 and 10.

The procedure for use is similar to that discussed in connection with FIGS. 2–5. Referring now to FIG. 9, the user places portion 30' over the known image 182 until it just spans the distance between lines 37', 38' (see FIG. 9). While maintaining portion 30' over object 182, the user rotates portion 32' until proper one of lines 42' corresponding to object 182 of known size (e.g., the "2 mm" line) intersects object 182. Holding portions 30', 32' in fixed relationship, the user slides the device until unknown-size object 202 just spans between lines 37'–38' and reads its size directly from the scale value associated with radial line 422' intersecting object 202, e.g., 4 mm.

FIG. 10 illustrates the same function as described in connection with FIG. 9 but with a different magnification ratio and different size, e.g., 1.5 mm for reference object 183. The relative angular position of portion 32' and 30' are thus different than in FIG. 9, but the method of use is identical. After portions 30', 32' have been rotated relative to each other such that correct radial scale line 421' (e.g., 1.5 mm in FIG. 10) passes through reference object 183 where it just bridges between lines 37', 38', the two parts are kept clamped together and unknown object 203 is located so as to bridge lines 37', 38', and the size thereof read directly from radial scale line 422' passing through object 203 (e.g., 4 mm). The device illustrated in FIGS. 7–10 has the advantage that portions 30', 32' are retained together by pivot 50 so they do not become separated. This is a significant convenience.

A device suitable for use with medical imaging, was constructed with portion 30 forming a sector of a circle of about 90 mm radius and 110 degrees of arc and portion 32 forming a sector of a circle of the same radius and subtending about 80 degrees of arc. The separation of lines 37', 38' varies from about 1 mm at one end to about 20 mm at the other end. Lines 42' conveniently have a radial length of about 20–25 mm, but this is not critical so long as they extend about across the widest spacing between lines 37', 38'.

For simplicity of illustration, magnification ratio scale 40 and arrow 48 have been omitted from FIGS. 7–10, but those of skill in the art will understand that the rotational arrangement of FIGS. 7–10 can equally well include scale 40 and arrow 48. In this situation, scale 40 is conveniently a curve of constant radius and arrow 48 is a radial line arranged to point to scale 40, just as in the arrangement of FIGS. 2–5. For example, magnification ratio 1:1 corresponds to the relative angular position where, for example, the 1 mm radial scale line crosses lines 37', 38' where their spacing equals 1 mm and the 6:1 magnification ratio where the 1 mm radial scale line crosses lines 37', 38' where they are 6 mm apart.

In the embodiment of FIG. 1, lines 13 are illustrated as being straight lines, and in the embodiments of FIGS. 2–10, lines 37, 38, 37', 38' are shown as being curves. Straight or curved lines may be used in either arrangement, but the curved lines illustrated in FIGS. 2–10 have particular advantages. It is especially desirable that the spacing of lines 37, 38 be exponentially related to the distance along direction 34 and that the spacing of lines 37', 38' be exponentially related to the distance along arc 34' (or alternatively to the angle subtended along arc 34' about pivot 50). The manner in which curves 37, 38 and 37', 38' are formed will be more fully understood by reference to FIGS. 11 and 12.

Figure 11:
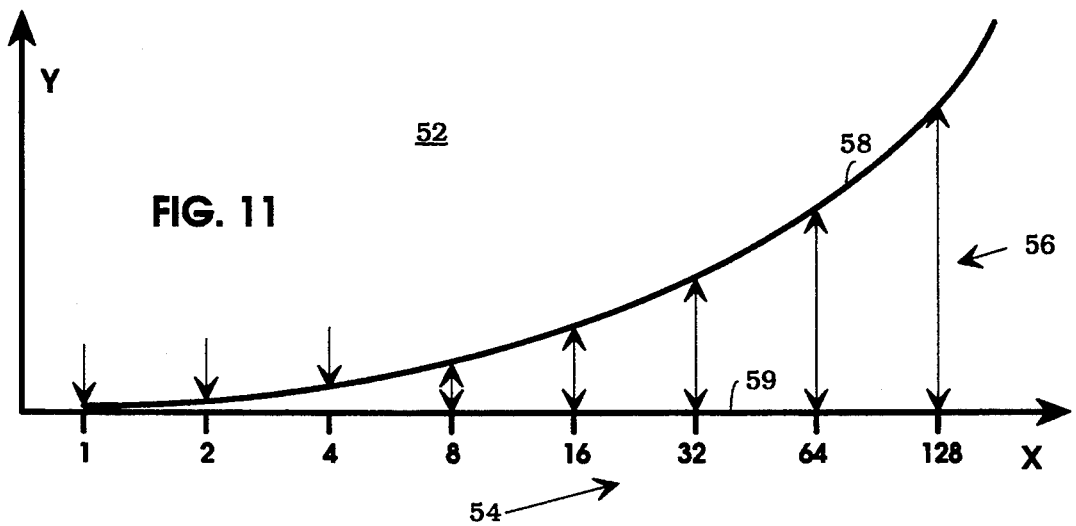
FIGS. 11 and 12 are graphical displays illustrating a method of construction of the divergent line pairs used in the present invention.
Figure 12:
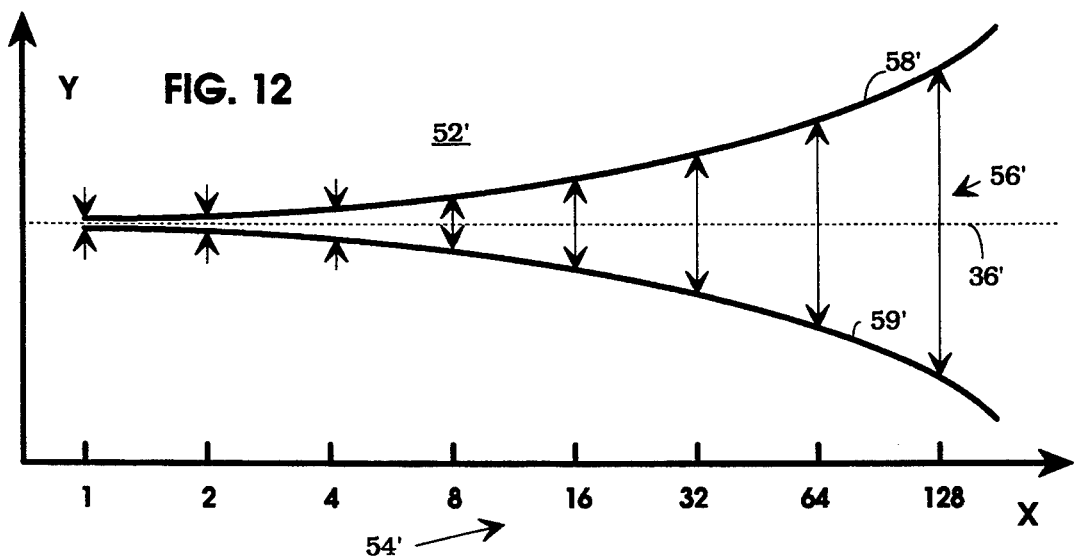

FIGS. 11 and 12 are graphs which illustrate how the spacing of lines 37, 38 and 37', 38' may be conveniently determined as a function of distance along direction 34 or along arc 34'. FIG. 11 shows graph 52 of the equation $x = \log_n(y)$ or $y = n^{(x)}$. For convenience of construction, the abscissa (X) (line 59) has scale values 54 in which a constant distance increment along the X axis corresponds to a scale value 54 of twice the proceeding value, and the distances 56 in the Y direction between line 59 and line 58 for each X axis increment are proportional to the magnitude of scale values 54 at each increment. For example, at X=1, curve 58 is one unit up the Y axis, and at X=16, it is 16 units up the Y axis and at X=128, it is 128 units up the Y axis, and so forth. On the X axis, the scale markers 1, 2, 4, 8, . . . etc., are equally spaced. Thus, curve 58 is an exponentially rising curve relative to line 59. It is desirable that curves 37, 38 and 37', 38' have their separation increase exponentially with distance in FIGS. 2–6 and exponentially with arc length or angle in FIGS. 7–10. Similar to FIGS. 11–12, the vertical (or radial) lines in FIGS. 2–10 and their associated scale values are logarithmically spaced, just as in a slide rule or on logarithmic graph paper. It is desirable that the distance along lines 37, 38 (and lines 37', 38'), for which the spacing of lines 37, 38 (and lines 37', 38') doubles, and for which the magnification ratio on scale 40 doubles, and for which the scale values on lines 42, 42' double, is the same.

FIG. 12 is similar in concept and construction to FIG. 11, except that two curved lines 58', 59' are used rather than one curved and one straight line 58, 59. The same relationships exist, that is, separations 56' of lines 58', 59' at X=1 is 1 unit, at X=16 is 16 units, at X=128 is 128 units, etc. By way of example, the arrangement of FIGS. 7–10 corresponds to FIG. 11 but with line 58 reflected in line 59 and with line 59 bent to form an arc of a circle. Alternatively, the arrangement of FIGS. 7–10 may be viewed as corresponding to FIG. 11 which has rotated been around the X axis so that line 58 lies below line 59 and then lines 58, 59 bent to form curves such that line 59 is the arc of a circle. The arrangement of FIGS. 2–6 corresponds to FIG. 12 where curve 58' corresponds to curve 37, curve 59' corresponds to curve 38 and dashed lines 36, 36' are analogous. Either arrangement works satisfactorily.

Figure 13:
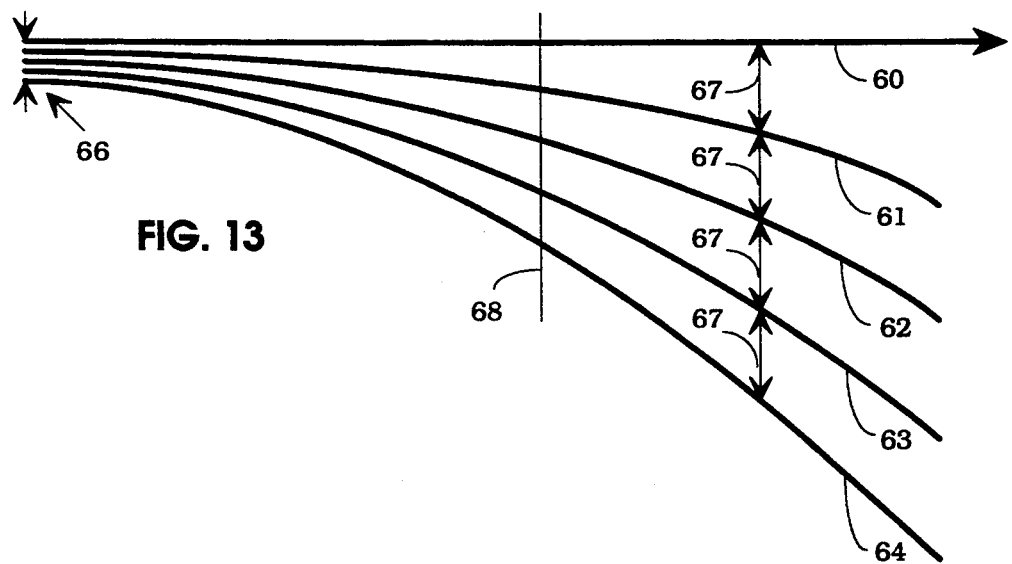
FIG. 13 is a graphical display illustrating the arrangement of multiple divergent line pairs suitable for use in an image size measuring apparatus.

While the example of FIGS. 2–6 and 7–10 have shown only two curves 37, 38, 37', 38', this is for convenience of explanation and not intended to be limiting. FIG. 13 illustrates an arrangement wherein there is provided a family of curves 60–64. Curves 60, 61 are analogous to curves 37, 38 or 37', 38' and 58, 59 or 58', 59'. While line 60 is shown as being straight, i.e., corresponding to line 59, this is not essential, but merely for convenience of illustration. Curves 62–64 are spaced from curve 61 so that spacings 67 at any given distance along reference line 60 are the same size. In this fashion the spacing between each curve increases by the same amount as one moves from left to right in the figure. By using a family of curves in place of individual curves 37, 38 or 37', 38', the family of curves provide a built-in ruler at any magnification. For example, if at the location shown by line 68, it has been determined that the spacing between lines 60 and 61 corresponds to, say, 4 mm, then the spacing between successive pair of lines 61–64 at location 68 is also 4 mm. This is equivalent to having a variable ruler built into the device and is an additional feature of the present invention.

It will be apparent that the present invention provides an apparatus and method for quick, accurate analysis of images, especially medical diagnostic images. The present invention is useful to determine the size of objects visible in the image or to determine the magnification of the image or a combination thereof. The dimensions of an object of unknown size may be determined from the magnification ratio and a scale provided by the present invention or by use of the scales of the present invention in combination with a reference object of known size, from which the magnification ratio may also be determined if not known.

It will be further apparent that the invented arrangement is particularly simple to manufacture, is inexpensive and requires little training to operate. It will be still further apparent that the present invention is especially suitable for image analysis and object sizing in the medical imaging field and other fields where determining the size of objects is important. In particular, devices useful for medical imaging can be constructed which easily fit into a pocket and are easily portable. Further, in addition to being useful for medical imaging, the present invention is applicable to a wide range of measurement tasks of a similar nature, irrespective of the scale of the images being analyzed.

Having thus described the invention, those of skill in the art will appreciate that numerous variations may be made thereon without departing from the scope of the appended claims. For example, while plastic is a preferred material for fabrication of the present invention, any transparent material adapted to receive markings (lines, scale markers, etc.) maybe used. Further, while the use of straight and curved lines has been illustrated this is not intended to require the use of lines of a particular shape, although straight lines are preferred in the embodiment of FIGS. 1 and curved lines in the embodiments of FIGS. 2–10. Those of skill in the art will understand based on the description herein that various mathematical relationships may be used for the separation of the spaced-apart lines as a function of the distance therealong, and that while the exponential and logarithmic relationships illustrated in FIGS. 11–13 are preferred in certain applications, as for example in medical imaging, other relationships may be more desirable for other applications, which persons of skill in the art can determine without undue experimentation based upon their particular needs. Accordingly, it is intended to include these and such other variations as will occur to those of skill in the art having read this invention description, in the claims that follow.

What is claimed is:

1. A device for determining, in an image, the dimensions of an object of unknown size, comprising:
   a first transparent portion having thereon at least two divergent lines whose spacing increases in a first direction;
   a second transparent portion, superimposed on the first portion so that the object being measured may be viewed through the superposed first and second portions between the divergent lines, and wherein the second portion is movable with respect to the first portion and has thereon multiple spaced apart line segments identified by associated scale values, wherein said multiple line segments are oriented so as to cross said divergent lines, wherein said multiple line segments have spacings which increase in said first direction in proportion with said scale values, and wherein a ratio of separations of said divergent lines at locations crossed by any two of said multiple line segments is proportional to a ratio of said scale values associated with said any two of said multiple line segments; and
   wherein the dimension of the object of unknown size may be determined by (i) placing the device over an object of known dimension that just fits between said divergent lines at a first location along said divergent lines, (ii) adjusting the relative position of the first and second portions to place at the first location, one of said multiple crossing lines having a scale value corresponding to the known dimension and, (iii) while maintaining the relative position of the first and second portions, placing the device so that the object of unknown size just fits between said divergent lines at a second location and then determining the dimension of the object of unknown size from the scale value of another of said multiple crossing lines proximate the second location.

2. A device for determining, in an image, the dimensions of an object of unknown size, comprising:
   a first portion having thereon at least two divergent lines;
   a second portion, movable with respect to the first portion, and having thereon multiple spaced apart line segments oriented so as to cross said divergent lines, wherein separation of the divergent lines doubles in a predetermined distance along the divergent lines and wherein scale values associated with the multiple line segments also double in value in the same magnitude of distance in the same direction along the divergent lines, wherein, when a first crossing line segment having a first scale value is placed at a first location along the divergent lines where the separation of the divergent lines corresponds to a size of a first object in the image having a known dimension corresponding to said first scale value, and with the relative position of the first and second portions temporarily fixed, then the dimension of another object of unknown size in the same image may be determined from a scale value associated with a second crossing line segment proximate a second location where the separation of the divergent lines matches the size of the unknown object.

3. The device of claim 2 wherein one of the divergent lines forms an arc of a circle.

4. A device for determining, in an image, the dimensions of an object of unknown size, comprising:

a first portion having thereon at least two divergent lines;

a second portion, movable with respect to the first portion, and having thereon multiple spaced apart line segments with associated scale values, said line segments oriented so as to cross said divergent lines, wherein the divergent lines are separated by a distance whose magnitude is exponentially related to a longitudinal distance along the divergent lines, wherein, when a first crossing line segment having a first scale value is placed at a first location along the divergent lines where the the separation of the divergent lines corresponds to a size of a first object in the image having a known dimension corresponding to said first scale value, and with the relative position of the first and second portions temporarily, fixed, then the dimension of another object of unknown size in the same image may be determined from a scale value associated with a second crossing line segment proximate a second location where the separation of the divergent lines matches the size of the unknown object.

5. The device of claim 4 wherein the first and second portions rotate with respect to each other.

6. A device for determining, in an image, the dimensions of an object of unknown size, comprising:

a first portion having thereon at least two divergent lines;

a second portion, movable with respect to the first portion, and having thereon multiple spaced apart line segments and scale values associated with said line segments, said line segments oriented so as to cross said divergent lines, wherein one of the divergent lines forms an arc of a circle, and wherein the separation of the divergent lines is exponentially related to an angle around the arc of the circle, wherein, when a first crossing line segment having a first scale value is placed at a first location along the divergent lines where the separation of the divergent lines corresponds to a size of a first object in the image having a known dimension corresponding to said first scale value, and with the relative position of the first and second portions temporarily fixed, then the dimension of another object of unknown size in the scale image may be determined from a scale value associated with a second crossing line segment proximate a second location where the separation of the divergent lines matches the size of the unknown object.

7. A device for determining, in an image, the dimensions of an object of unknown size, comprising:

a first portion having thereon at least two divergent lines;

a second portion, movable with respect to the first portion, and having thereon multiple spaced apart line segments with associated scale values, said line segments oriented so as to cross said divergent lines, wherein the divergent lines are curved, and the multiple spaced apart line segments are oriented approximately radially with respect to said curved lines, wherein, when a first crossing line segment having a first scale value is placed at a first location along the divergent lines where the separation of the divergent lines corresponds to a size of a first object in the image having a known dimension corresponding to said first scale value, and with the relative position of the first and second portions temporarily fixed, then the dimension of another object of unknown size in the same image may be determined from a scale value associated with a second crossing line segment proximate a second location where the separation of the divergent lines matches the size of the unknown object.

8. A device for determining the magnification of an image, comprising:

a first transparent portion having thereon at least two divergent lines whose spacing increases in a first direction;

a second transparent portion, superimposed on the first portion so that the object being measured may be viewed through the superposed first and second portions between the divergent lines, and wherein the second portion is movable with respect to the first portion and has thereon multiple line segments having associated scale values, wherein said multiple line segments are oriented so as to cross said divergent lines, wherein said multiple line segments have a spacing which increases in said first direction in proportion with said scale values, and wherein a ratio of separation of said divergent lines at locations crossed by any two of said multiple line segments is proportional to a ratio of said scale values associated with said any two of said multiple line segments; and a magnification scale on one of the first or second portions and a magnification indicator on the other of the first or second portions, wherein the juxtaposition of the magnification scale and magnification indicator shows the magnification of the image when a crossing line segment corresponding to a size value equal to the true size of a reference object in the image is located over the reference object when the reference object bridges between the two divergent lines.

9. A device for determining the magnification ratio of an image, comprising:

a first portion having thereon two divergent lines and a magnification ratio indicator, wherein the magnification ratio indicator has numerical values associated therewith which increase in a first direction, and wherein a first distance along the magnification ratio indicator in which the numerical values double, is the same as a second distance along the divergent lines in which their spacing doubles; and a second portion movably coupled to the first portion and having thereon multiple spaced apart lines at least some of which have associated therewith monotonically increasing image size values, and wherein a third distance measured in substantially the same direction as the first and second distances in which the image size values double, is the same as the first and second distances, and wherein said second portion has thereon a pointer which, as the first and second portion are moved relative to each other, points to various of said numerical values on said magnification ratio indicator; and wherein the first and second portions cooperate so that the magnification ratio of an image can be determined by placing the first portion over an object of known size such that the object of known size extends between the divergent lines and adjusting the relative position of the first and second portions such that one of the spaced apart lines having an associated image size value corresponding to the known size intersects the divergent lines at the location of the object of known size and then reading the magnification ratio from the magnification ratio indicator at the location of the pointer.

10. The device of claim 9 wherein the first and second portions are rotatably coupled.

11. The device of claim 9 wherein the first and second portions are slideably coupled.

12. The device of claim 9 wherein the spacing between the divergent lines increases exponentially with the first distance.

13. The device of claim 12 wherein the multiple spaced-apart lines are logarithmically spaced.

14. The device of claim 9 further comprising more than two divergent lines.

15. A device for determining, in an image, the dimensions of a second object based on a known size of a first object in the same image, comprising, a transparent base through which the object being measured is viewed, said base having thereon,
 (i) a first array of spaced apart horizontal lines,
 (ii) a second array of line pairs, each line pair formed from symmetrically placed divergent lines oriented at substantially equal angles on either side of a centerline, wherein each said centerline is oriented at approximately right angles to the first array, and
 (iii) size values corresponding to each of the line pairs, so that size values of successive line pairs have the same ratios as ratios of spacings of successive line pairs measured along any of said spaced apart horizontal lines; and wherein,
 (a) when the device is placed over the first object so that one of the spaced apart horizontal lines bisects the first object and the first object extends between the divergent lines of one of said line pairs having a size value equal to the known size of the first object, and
 (b) when the device is moved so as to be placed over the second object so that said one of the spaced apart horizontal lines bisects the second object and the second object extends between the divergent lines of another of said line pairs, wherein the size value corresponding to said another of said line pairs corresponds to the size of the second object.

16. The device of claim 15 wherein the adjacent line pairs are in contact.

17. The device of claim 15 wherein the centerlines of the line pairs are substantially parallel to each other.

18. The device of claim 15 wherein the first array of lines comprise broken lines adjacent to the lines of symmetry.

* * * * *